Feb. 19, 1952 E. L. C. WHITE 2,586,409

ELECTRICAL PULSE GENERATING CIRCUITS

Filed June 1, 1948

INVENTOR
Eric Lawrence Casling White
BY Joseph O. Ollier
ATTORNEY

Patented Feb. 19, 1952 2,586,409

UNITED STATES PATENT OFFICE 2,586,409

ELECTRICAL PULSE GENERATING CIRCUITS

Eric Lawrence Casling White, Iver, England, assignor to Electric & Musical Industries Limited, Hayes, England, a company of Great Britain Application June 1, 1948, Serial No. 30,285
In Great Britain June 4, 1947

9 Claims. (Cl. 250—27)

This invention relates to electrical pulse generating circuits, and it relates especially but not exclusively to such circuits for generating a sequence of pulses for switching or gating purposes in time-multiplex apparatus.

According to the invention there is provided an electrical pulse generator comprising a plurality of thermionic valve stages arranged in cascade and each having a stable state in which it tends to remain and an unstable state to which it can be changed, a time constant circuit being provided in each of said stages whereby when one of said stages is changed to its unstable state it is caused to remain therein for a time determined by said time constant circuit and thereupon returns to its stable state, and said stages being so coupled together that the return of one of said stages from its unstable to its stable state causes a succeeding stage to be changed to its unstable state, the arrangement being such that changes in the state of said stages serve to generate pulses having predetermined durations.

In order that the said invention may be clearly understood and readily carried into effect, the same will now be more fully described with reference to the accompanying drawings, in which—

Figure 1:
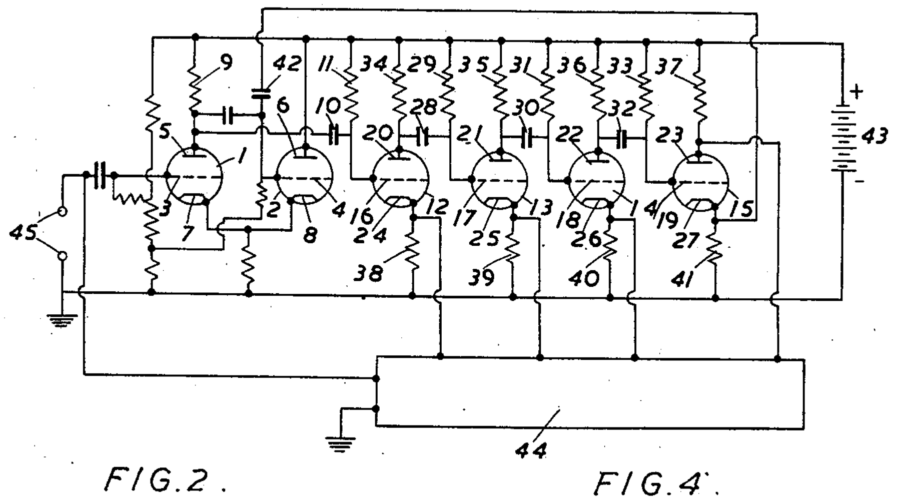
Figure 1 shows an electrical pulse generator according to the invention.

Referring first to Figure 1 of the drawings, the generator shown comprises a pair of valves 1 and 2 having control grids 3, 4 anodes 5, 6 and cathodes 7, 8 respectively, and arranged in known manner as a trigger device employing a cathode-coupled valve pair having two effective states of equilibrium. The anode load 9 of the valve 1 is coupled via condenser 10 and leak resistance 11 to the control grid of a valve 12 in the first of a plurality of thermionic valve stages, the other stages comprising respectively the valves 13, 14 and 15 arranged in cascade. The valves 12 to 15 have control grids 16, 17, 18, 19, anodes 20, 21, 22, 23 and cathodes 24, 25, 26, 27 respectively and the input circuit of each of the stages comprises a time constant circuit provided in the case of the valve 12 by the condenser 10 and the resistance 11 and in the case of the other stages by condenser/resistance combinations indicated at 28, 29, 30, 31, 32, 33, respectively, the condenser/resistance combinations serving to couple the anodes of the valves 12, 13 and 14 to the control grids of the valves 13, 14 and 15 respectively. Each of said plurality of valves has an anode load 34, 35, 36, 37 and a cathode load 38, 39, 40, 41 respectively. The cathode 27 of valve 15 is coupled to the control grid 4 of valve 2 via condenser 42. A battery 43 or other suitable potential source provides the high tension supply for the circuit, the leak resistances 11, 29, 31, and 33 and the anode loads 34, 35, 36 and 37 being connected as shown to the positive terminal of the source 43. The source 43 thus applies standing positive bias to the control electrode of each of the valves 12 to 15 which normally maintains each of said valves conducting. Numeral 44 indicates a part of the circuit to be described in detail with reference to Figure 3.

The circuit shown in Figure 1 is arranged to be operated under the control of positive pulses applied to the terminals 45, and in operation valve 1 of said trigger device is arranged to be non-conducting while the valve 2 is arranged to be conducting just before the application of a positive pulse to its control grid 3, while each of the valves 12 to 15 is conducting on account of the positive bias applied to the control grids thereof via the resistances 11, 29, 31 and 33. On the application of said pulse, the condition of valves 1 and 2 is reversed and the trigger device changes from one state of equilibrium to the other, i. e., valve 1 becomes conducting and valve 2 becomes non-conducting, thus causing a negative potential excursion to be generated at the anode 5 of valve 1. This negative potential excursion is applied to the control grid 16 of valve 12, rendering this valve non-conducting and causing a positive pulse to be generated at its anode 20, the leading edge of this pulse being applied as a positive potential excursion via condenser 28 and resistance 29 to the control grid 17 of valve 13 where since the valve 13 is already conducting the positive potential excursion has no effect. Valve 12 returns to its normal conducting state after a time interval determined by the amplitude of the negative potential excursion set up at the anode 5 of valve 1, the magnitude of the battery voltage 43, and the time constant of the coupling circuits 10 and 11. The return to the conducting state of valve 12 sets up a negative potential excursion at its anode 20, and this potential excursion is applied to the control grid 17 of valve 13, rendering valve 13 non-conducting. Valve 13 returns to the conducting state after another time interval determined by the time constant of the coupling circuit 28, 29 the magnitude of the battery voltage 43, and the amplitude of the pulse applied to its grid 17.

Thus the return of each of the thermionic valve stages to its stable state in which the respective valve is conducting, causes the succeeding stage to be changed to an unstable state in which the respective valve is non-conducting, the time for which each stage remains in an unstable state in each case being determined by the time constant of the grid coupling circuit associated with each valve, assuming a given value of battery voltage 43, and a given amplitude of applied pulse. Changes in the state of the stages cause substantially rectangular pulses to be generated at the cathode or at the anodes of the valves 12 to 15, and the duration of each of the generated pulses may be the same or may be different depending on the time constant of the grid coupling circuit associated with each valve. The trigger pair is restored to its initial state of equilibrium by means of a positive pulse set up at the cathode 27 of valve 15, when the valve returns to the conducting state after being non-conducting, said positive pulse being applied to the control grid 4 of valve 2 through condenser 42. Pulses generated by the valves 12, 13, 14 and 15 may be taken from across the cathode load resistances 38 to 41 or the anode load resistances 34 to 37 of each of said valves. The generator shown in Figure 1 thus generates a group of pulses each of a predetermined duration and having the beginning of each succeeding pulse determined by the end of the preceding pulse, and the application of successive triggering pulses to the triggering device causes successive groups of pulses to be generated by the generator.

The pulse generator according to the invention has a variety of applications. For example, it may be used for operating a number of gating or switching circuits in time-multiplex apparatus. Time-multiplex apparatus is one in which a single communication channel is allocated, in turn, to a number of subsidiary communicating channels, each of these subsidiary channels being connected to the main channel at the transmitting end by means of a gating device and the main channel being connected at the receiving end to a corresponding series of subsidiary channels by means of a second gating device operating in exact synchronism with the gating device at the transmitting end. Intelligence may be transmitted through any of the subsidiary channels in any known manner, such as, for example, by pulse width modulation or by sub-carriers which are amplitude or frequency modulated, and so on.

Such a time-multiplex system is particularly desirable in a television outside broadcast system where it is frequently necessary for there to be several cameras in use, separated from each other and from central control equipment by considerable distances. To permit gradual fading of picture signals from one camera to picture signals from another it is essential to have each camera supplied with line and frame synchronising pulses from a common source, this source being most conveniently situated at the central control equipment. It is desirable to arrange for the link between each camera and the central control equipment to be as simple as possible, e. g., to consist of only one cable or of only two radio channels (one in each direction). Fundamentally one such link has to convey only one form of intelligence in each direction, namely line and frame synchronising pulses from the central control equipment to the camera, and picture signals from the camera to the control equipment. In practice, however, a number of control and supervisory channels are also necessary, for example, a two-way operators' speech channel and a number of signalling lamp or cue channels. In a particular system two signalling lamp or cue channels and one speech channel may be required from the control equipment to each camera. Some form of multiplexing is clearly necessary so as to save the provision of further cable or radio links between each camera and the control equipment.

Figure 2:
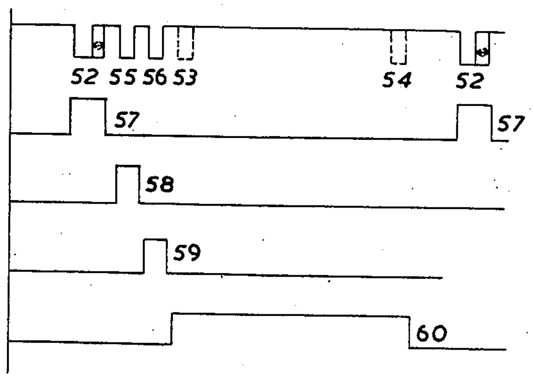
Figures 2 and 3 illustrate the application of the generator of Figure 1 in television multiplexing apparatus.

In such an outside broadcast system the line and frame synchronising pulses instead of being of different durations may be of the same duration and the frame synchronising pulses may be selected from the mixed frame and line synchronising pulses by the use of pulses generated by the circuit shown in Figure 1. Where the broadcast system employs interlaced scanning the frame synchronising pulses will occur at different intervals following the preceding line synchronising pulses in alternate frames, as is usual in an interlaced system. Figure 2 of the drawings illustrates a number of line synchronising pulses 52 and in dotted lines there are indicated two frame synchronising pulses of similar form to the line sychronising pulses, these pulses being indicated at 53 and 54, the pulses 53 and 54 occurring at different times dependent on whether an odd or an even frame is being scanned. Interspersed with the line and frame synchronising pulses are two further pulses 55 and 56 which serve to convey the two cue lamp on-off signals by amplitude-modulated sub-carriers or simply by amplitude modulation of the pulses. In order to convey speech, the line synchronising pulse 52 may be width modulated as indicated by the arrows in Figure 2. The line and frame synchronising pulses 52, 53 and 54 and the pulses 55 and 56 are transmitted and in order that the pulses can be selected in suitable time related manner so as to be fed through their appropriate channels, four gating pulses 57, 58, 59 and 60 are employed, these gating pulses being generated by the generator shown in Figure 1. The gating pulses 57 are arranged to select only with modulated line synchronising pulses 52, the gating pulses 58 selecting the cue lamp pulses 55, the gating pulses 59 selecting the cue lamp pulses 56, and the gating pulses 60 which it will be observed are of longer duration than the pulses 57, 58, and 59 are arranged to select whichever of the frame synchronising pulses 53 or 54 may be present in the train of line synchronising pulses. In order to select whichever of the pulses 53 or 54 is present by means of a single pulse 60 it is necessary for the pulses 55 and 56 to occur in the interval between the pulses 52 and 53 or to occur after the pulse 54 but before the succeeding pulse 52, and since the timing of the generator shown in Figure 1 is determined by the pulses 52, the pulses 55 and 56 are preferably caused to occur between the pulses 52 and 53, as shown.

Figure 3:
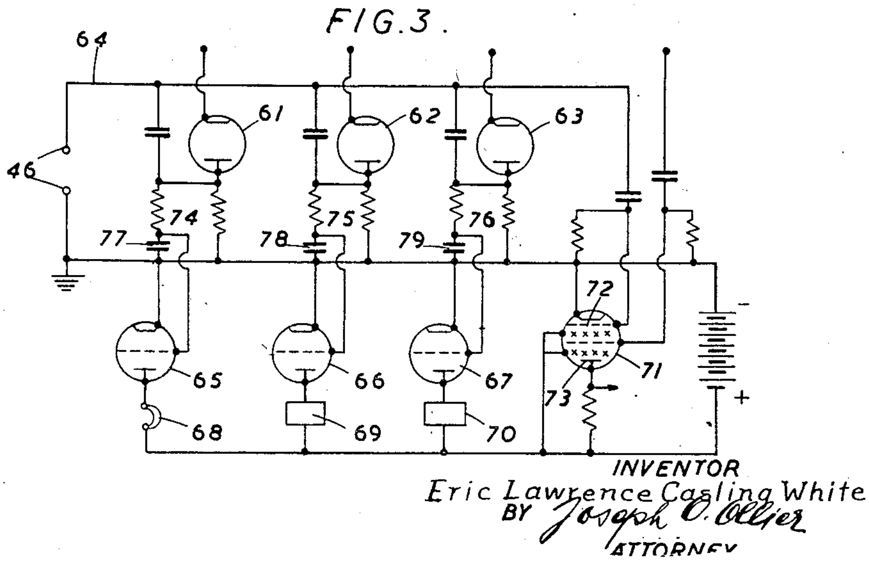

Figure 3 shows a diagram of a circuit for separating the pulses 52, 53, 54, 55 and 56 under the control of the gating pulses 57, 58, 59 and 60, said circuit being suitable for use as the part 44 in Figure 1. In Figure 3, three diodes 61, 62, and 63 are provided, the cathodes of said diodes being connected to the cathodes 24, 25 and 26 of valves 12, 13 and 14, respectively, of Figure 1. The line synchronising pulse 52 interspersed with the pulses 53, 54, 55 and 56 are applied to the terminal 45 of Figure 1 and simultaneously to the terminal 46 of Figure 3 and each line synchronising pulse 52 initiates the generation of a group of pulses 57, 58, 59 and 60 by the generator shown in Figure 1. The pulses 57 to 59 are derived from the cathodes 24, 25 and 26 and therefore are of negative form, causing the diodes 61, 62 and 63 to be successively rendered conducting, so as to demodulate the pulses 52, 55 and 56 in succession. Output voltages are set up across the anode circuits of the diodes indicated in general at 74, 75 and 76, and after being smoothed across condensers 77, 78 and 79 are applied to amplifying valves 65, 66 and 67, which have in their anode circuits, respectively, telephones 68 and cue lamp relays 69 and 70. The pulse 60 is taken in the positive sense from the anode 23 of valve 15, Figure 1, and is applied to the multigrid valve 71, Figure 4, in such a manner as to render it conducting and able to relay frame synchronising pulses applied to its grid 72 from terminals 46. Separated frame synchronising pulses are derived from the anode 73 of valve 71. Line synchronising pulses can be derived from a suitable point in the circuit associated with diode 61 or from the cathode circuit of valve 12 of Figure 1, or alternatively a line synchronising pulse separator can be inserted between the terminals 46 and the trigger device, line synchronizing pulses being obtained from the separator. In this last alternative, only the line synchronising pulses will be applied to the trigger device.

Figure 4:
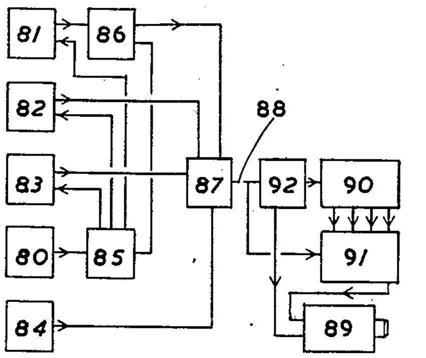
Figure 4 illustrates diagrammatically in block form one example of television equipment utilising multiplex apparatus according to Figures 2 and 3.

Referring to Figure 4, the television transmitting equipment employing time-multiplex apparatus as described with reference to Figures 1 to 3 comprises a source 80 of the line synchronising pulses 52, a source 81 of the speech signals with which the line synchronising pulses are modulated, sources 82 and 83 of the cue lamp signals 55 and 56 and a source 84 of the frame synchronising pulses 53 and 54. The line synchronising pulses from the source 80 are utilised to control a gating pulse generator 85 which may be of the kind illustrated in Figure 1 and which serves to control the output of signals from the sources 81, 82 and 83. From the pulse generator 85 the line synchronising pulses pass to a modulator 86 where they are modulated by the speech signals from the source 81, for example, by width modulation as indicated in Figure 2. The line synchronising pulses then pass to a circuit 87 where they are interspersed with the frame synchronising pulses from the source 84 and with the pulses from the sources 82 and 83. The units 80 to 87 comprise the central control equipment of the system and the train of interspersed pulses is transmitted therefrom to a remotely located television camera by a single channel indicated by the dotted line 88 and which may comprise a cable or radio link. The camera is indicated diagrammatically at 89 and it is provided with time-multiplex apparatus comprising a pulse generator as illustrated in Figure 1 and indicated in general at 90 and a separator circuit 91 as illustrated in Figure 3. The train of interspersed pulses is applied directly to the separator circuit 91 and also to a line synchronising pulse separator 92 which removes the pulses 53, 54, 55 and 56 leaving only the line synchronising pulses 52 which are applied to the camera 89 and to the pulse generator 90 where as above described they initiate generation of successive groups of pulses 57, 58, 59 and 60. The frame synchronising pulses from the circuit 91 are, of course, also applied to the camera 89. The link 88, if it comprises a cable, may also be utilised to transmit the picture signals from the camera to the control equipment, and also any necessary control information, by the employment of a so-called hybrid unit at each end of the link in known manner.

What I claim is:

1. An electrical pulse generator comprising a plurality of thermionic valves each having at least an anode, a control electrode and a cathode, an impedance in the anode circuit of each of said valves, a separate leak resistance connecting the control electrode of each valve to a source of standing bias potential to determine a stable state in which each valve tends to remain independently of the remainder of said valves, means including a capacity for feeding to the control electrode of the first of said valves a potential excursion counteracting standing bias applied by the respective leak resistance to change said first valve to an unstable state for a time determined by the time constant of said capacity and respective leak resistance, thereafter said first valve being automatically restored to its stable state, and a separate capacity coupling the control electrode of each successive valve to the anode of each preceding valve, whereby the return of one valve from an unstable to its stable state causes the succeeding valve to change to an unstable state and remain therein for a time determined by the time constant of the respective coupling capacity and leak resistance, whereby changes in the state of the valves causes the generation of a series of pulses of a duration determined by the time constants of the respective coupling capacities and leak resistances and the start of each pulse having its timing determined by the end of the preceding pulse.

2. An electrical pulse generator comprising a plurality of thermionic valves each having at least an anode, a control electrode and a cathode, an impedance in the anode circuit of each of said valves, a separate leak resistance connecting the control electrode of each valve to a source of standing positive bias potential, whereby each of said valves tends to remain in a conducting condition, means including a capacity for feeding to the control electrode of the first of said valves a potential counteracting the standing bias to change said first valve to a non-conducting condition, and a separate capacity coupling the control electrode of each succeeding valve to the anode of the preceding valve, whereby the return of one valve from a non-conducting to a conducting condition causes the application of potential excursion counteracting the standing bias to the succeeding valve to change it to a non-conducting condition and remain therein for an interval determined by the time constant of the respective coupling capacity and leak resistance, and whereby successive changes in the condition of the valves causes the generation of a series of pulses of mutually independent durations, the start of each pulse having its timing determined by the end of the preceding pulse.

3. An electrical pulse generator comprising a plurality of thermionic valves each having at least an anode, a control electrode and a cathode, a resistance in the anode lead of each valve, a separate leak resistance connecting the control electrode of each valve to a source of positive bias potential, whereby each of said valves tends to remain in a conducting condition independently of the other valves, resistances in the cathode leads of said valves, means including a capacity for feeding to the control electrode of the first of said valves negative potential excursions to change said first valve to a non-conducting condition, and a separate capacity coupling the control electrode of each succeeding valve to the anode of the preceding valve, whereby the return of one valve from a non-conducting to a conducting condition causes the succeeding valve to change to a non-conducting condition and remain therein for an interval determined by the time constant of the leak resistance and coupling capacity connected to its control electrode, whereby the changes in condition of the valves causes the generation of a series of pulses of positive polarity at the anodes of said valves and similar series of pulses of negative polarity at the cathodes of said valves, said pulses being of mutually independent durations and the start of each pulse having its timing determined by the end of the preceding pulse.

4. An electrical pulse generator comprising a plurality of thermionic valves each having an output electrode and an input electrode, means applying a standing bias individually to each of said valves to determine a stable state for the respective valve in which the valve tends to remain independently of the remainder of said valves, means for feeding to the input electrode of the first of said valves a potential counteracting the respective biassing means to change said first valve to an unstable state, a time constant circuit operative to restore the standing bias to said first valve after a time determined by said time constant circuit to restore said first valve to its stable state, and means coupling the input electrode of each succeeding valve to the output electrode of the preceding valve to apply a potential to each valve counteracting the respective standing bias when the preceding valve is restored from an unstable to its stable state, thereby to change the succeeding valve to an unstable state, said last-mentioned means including a time constant circuit connected to an electrode of each of said valves operative when the respective valve is changed to an unstable state to restore the standing bias on the respective valve after a time determined by the respective time constant circuit and automatically restore the respective valve to its stable state, whereby changes in the state of the valves cause the generation of a series of pulses of a duration determined by the respective time constant circuits.

5. An electrical pulse generator comprising a plurality of thermionic valves each having an output electrode and an input electrode, means applying standing bias to determine a stable state in which the respective valve tends to remain independently of the remainder of said valves, a pulse operated trigger device having two effective states of equilibrium coupled to the input electrode of the first of said valves to counteract the standing bias and change said first valve to an unstable state when said trigger device is changed from one of its states of equilibrium to the other, a time constant circuit operative to restore the standing bias on said first valve after a time determined by said time constant circuit to restore said first valve to its stable state, means coupling the input electrode of each succeeding valve to the output electrode of the preceding valve to apply a potential excursion counteracting the standing bias to the succeeding valve when the preceding valve changes from an unstable state to its stable state, thereby to change the succeeding valve to an unstable state, said last-mentioned means including a separate time constant circuit connected to an electrode of each valve and operative to restore the standing bias applied to the respective valve when changed to an unstable state after a time determined by the respective time constant circuit to restore the respective valve to its stable state, and means coupling the output electrode of the last of said valves to the trigger device to cause the trigger device to return to its first-mentioned state of equilibrium when the last of said valves is restored from an unstable to its stable state, whereby a change of said trigger device from said first-mentioned state of equilibrium to the other initiates the generation of a series of pulses of duration determined by said time constant circuits, the start of each pulse having its timing determined by the end of the preceding pulse.

6. An electrical pulse generator comprising a plurality of thermionic valves each having at least an anode, a control electrode and a cathode, an impedance in the anode circuit of each of said valves, a separate leak resistance connecting the control electrode of each valve to a source of positive bias potential to apply a standing bias to each valve normally maintaining the respective valve in a conducting state independently of the remainder of said valves, a pulse operated trigger device having two effective states of equilibrium coupled via a capacity to the control electrode of the first of said valves to feed a potential excursion to the control electrode of said first valve counteracting the standing bias when the trigger device is changed from one of its states of equilibrium to the other, thereby to change said first valve to a non-conducting state, a separate capacity coupling the control electrode of each succeeding valve to the anode of the preceding valve, whereby the return of one valve from a non-conducting to a conducting state applies a potential excursion counteracting the standing bias to the succeeding valve to change the succeeding valve to a non-conducting state, and a coupling between the anode of the last valve and said trigger device to return the trigger device to its first-mentioned state of equilibrium when the last valve is changed from a non-conducting to a conducting state, the leak resistance and coupling capacity connected to the control electrode of each valve constituting a time constant circuit operative, when the respective valve is changed to a non-conducting state, to restore the standing bias applied to the respective valve after a time determined by the respective time constant circuit and cause the valve to return to its conducting state, whereby a change of said trigger device from its first-mentioned state of equilibrium to the other initiates the generation of a series of pulses of mutually independent durations.

7. An electrical pulse generator according to claim 5 and further comprising means for feeding synchronising pulses to said trigger device to change said device from its first-mentioned to its other state of equilibrium at intervals to cause the generation of successive series of said pulses.

8. An electrical pulse generator according to claim 6, said pulse operated trigger device comprising a two valve aperiodic multivibrator, and means for feeding synchronising signals to one valve of said multivibrator from the first mentioned state of equilibrium to the other at intervals to initiate the generation of successive series of said pulses.

9. In time-division multiplex signalling apparatus comprising a main channel, a plurality of subsidiary channels for feeding different intelligence signals to said main channel, and a gating device for each subsidiary channel whereby transmission of electrical signals between said main channel and subsidiary channels is normally prevented; the provision of an electrical pulse generator according to claim 1 arranged to feed pulses in succession to said gating devices to cause communication to be established successively between the subsidiary channels and the main channel.

ERIC LAWRENCE CASLING WHITE.

REFERENCES CITED

The following references are of record in the file of this patent:

UNITED STATES PATENTS

| Number | Name | Date |
|---|---|---|
| 2,021,743 | Nicolson | Nov. 19, 1935 |
| 2,272,070 | Reeves | Feb. 3, 1942 |
| 2,401,384 | Young, Jr. | June 4, 1946 |
| 2,405,237 | Ruhlig | Aug. 6, 1946 |
| 2,426,111 | Levy | Feb. 22, 1949 |

FOREIGN PATENTS

| Number | Country | Date |
|---|---|---|
| 49,111 | France | Nov. 7, 1938 |